(12) United States Patent
Zeng et al.

(10) Patent No.: US 12,519,145 B2
(45) Date of Patent: Jan. 6, 2026

(54) BATTERY CHARGER AND CHARGING CONTROL METHOD

(71) Applicant: Shenzhen Sanerli Technology Co., Ltd., Shenzhen (CN)

(72) Inventors: JinHui Zeng, Shenzhen (CN); JunCong Wu, Shenzhen (CN)

(73) Assignee: Shenzhen Sanerli Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/892,735

(22) Filed: Sep. 23, 2024

(65) Prior Publication Data
US 2025/0015373 A1 Jan. 9, 2025

(30) Foreign Application Priority Data

Feb. 1, 2024 (CN) .......................... 202420243119.0

(51) Int. Cl.
*H01M 10/44* (2006.01)
*H02J 7/00* (2006.01)

(52) U.S. Cl.
CPC ......... *H01M 10/441* (2013.01); *H02J 7/0013* (2013.01)

(58) Field of Classification Search
CPC .................................................. H01M 50/291
See application file for complete search history.

(56) References Cited

U.S. PATENT DOCUMENTS

| 4,612,491 A * | 9/1986 | McCarty | H02J 7/0042 |
| | | | 429/99 |
| 2004/0053120 A1* | 3/2004 | Lee | H01M 50/213 |
| | | | 429/97 |
| 2004/0130289 A1* | 7/2004 | Lam | H02J 7/0045 |
| | | | 320/107 |
| 2007/0024236 A1* | 2/2007 | Arakelian | H01M 50/296 |
| | | | 320/107 |
| 2016/0133889 A1* | 5/2016 | Tseng | H01M 10/425 |
| | | | 429/186 |

(Continued)

FOREIGN PATENT DOCUMENTS

CN 221748003 U * 9/2024

OTHER PUBLICATIONS

Machine translation of CN-221748003-U. (Year: 2024).*

*Primary Examiner* — Drew A Dunn
*Assistant Examiner* — Pamela J Jeppson
(74) *Attorney, Agent, or Firm* — IPro, PLLC; Na Xu

(57) ABSTRACT

A battery charger is provided, the battery charger comprises a housing and a cover, the housing has an open end, a charging stand is arranged inside the housing, multiple positioning grooves are arranged on the charging stand in an array to fix batteries, and a positive electrode plate is attached to bottoms of the positioning grooves; and the cover is rotatably connected to the open end, a negative electrode plate is arranged on an inner wall surface of the cover corresponding to the positioning grooves, a charging interface is formed on a side wall of the cover, and the charging interface is electrically connected to the positive electrode plate and the negative electrode plate to charge the batteries. According to the technical solution, batteries vertically placed side by side can be charged, which greatly reduces the volume of the charger and facilitates carrying and storage.

8 Claims, 6 Drawing Sheets

(56) References Cited

U.S. PATENT DOCUMENTS

2016/0172639 A1\* 6/2016 Seong ................ H01M 50/103
                                                        429/179
2021/0013722 A1\* 1/2021 Kim .................... H01M 10/441

\* cited by examiner

BATTERY CHARGER AND CHARGING CONTROL METHOD

TECHNICAL FIELD

The present disclosure relates to the technical field of battery chargers, and in particular, to a battery charger.

BACKGROUND

Since fossil fuels are increasingly scarce due to large-scale development and utilization by humans, the development and utilization of hydrogen energy have received increasing attention in recent years. A battery is a storage battery with good performance, and the battery is increasingly noticed as an important direction for the application of hydrogen energy. Currently, for most battery chargers on the market, a row of batteries are horizontally placed in a charging compartment and charged. When a large number of batteries need to be charged, the charging compartment is configured very long; consequently, the entire charging compartment has a large size, which is very inconvenient to carry.

SUMMARY

To solve the problems in the background, the present disclosure provides a battery charger in which batteries vertically placed side by side can be charged, which greatly reduces the volume of the charger and facilitates carrying and storage.

The solution used by the present disclosure to solve the technical problem is as follows: a battery charger, comprising:
   a housing, wherein the housing is provided with an open end, a charging stand is arranged inside the housing, multiple positioning grooves are arranged on the charging stand in an array to fix batteries, and a first electrode plate is attached to bottoms of the positioning grooves; and
   a cover, wherein the cover is connected to the open end, a second electrode plate is arranged on an inner wall surface of the cover corresponding to the positioning grooves, a side wall of the cover is provided with a charging interface, and the charging interface is electrically connected to the first electrode plate and the second electrode plate to charge batteries.

The present disclosure further provides a battery charger, which comprises:
   a housing, wherein the housing is provided with an open end, a charging stand is arranged inside the housing, multiple positioning grooves are arranged on the charging stand in an array to fix batteries, and a first electrode plate is attached to bottoms of the positioning grooves; and
   a cover, wherein the cover is connected to the open end, and a second electrode plate is arranged on an inner wall surface of the cover corresponding to the positioning grooves;
   wherein through holes are formed at bottoms of the positioning grooves, the first electrode plate is attached to the through holes, and a small metal pillar of a positive electrode of a battery contacts the first electrode plate to be charged only by passing through each of the through holes, so as to prevent the battery from being placed in the wrong direction; or a small metal pillar of a positive electrode of a battery contacts the second electrode plate to be charged only when the second electrode plate is recessed in an inner wall surface of the cover, so as to prevent the battery from being placed in the wrong direction.

The present disclosure further provides a charging control method, wherein the charging control method is implemented based on the foregoing battery charger, each of the positioning grooves of the battery charger corresponds to one charging compartment, and the charging control method comprises:
   step I: detecting an input voltage in real time;
   step II: if the input voltage is greater than a first preset voltage, adding one charging compartment to the original number of charging compartments for being charged; if the input voltage is less than a second preset voltage, reducing one charging compartment from the original number of charging compartments for being charged; and
   step III: cycling the step I and the step II to determine the maximum number of charging compartments and charging the maximum number of charging compartments.

In summary, the present disclosure has the following beneficial effects: according to the technical solution of the present disclosure, a charging stand is arranged inside a housing, multiple positioning grooves erected side by side are formed in the charging stand, a battery is placed in one of the positioning grooves, one end of the battery is connected to a positive electrode plate, and the other end of the battery is connected to a negative electrode plate. Through the above arrangement, the batteries vertically placed side by side can be charged. Compared with the conventional mode of charging a row of batteries placed horizontally, the present disclosure greatly reduces the size of the charger and facilitates carrying and storage.

1 housing, 11 open end, 12 clamping grooves, 2 charging stand, 21 mounting plate, 22 positioning groove, 23 clamping buckles, 24 positive electrode hole, 25 positive electrode plate, 251 spring, 252 hardware, 3 cover, 31 negative electrode plate, 32 charging interface, 33 upper cover portion, 34 lower cover portion, 35 circuit cavity, 36 circuit board, 37 power indicator light, 38 inner wall surface, 39 inner wall surface, 4 batteries.

DETAILED DESCRIPTION OF EMBODIMENTS

To make the content of the present disclosure more clearly understood, the present disclosure is further described below based on specific embodiments in conjunction with the accompanying drawings.

It should be noted that directions or positional relationships indicated by terms "central", "upper", "lower", "front", "rear", "left", "right", "inner", "outer" and the like used herein are those shown based on the accompanying drawings, and are merely intended to facilitate and simplify description rather than indicate or imply that the indicated apparatus or element must have a specific direction and must be configured and operated according to the specific direction. Therefore, these directions or positional relationships should not be construed as limiting the present disclosure. Unless otherwise stated, "a plurality of" means two or more than two.

Unless otherwise clearly specified and defined, the terms "mount", "interconnect", and "connect" should be understood in their broad sense. For example, the terms may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the aforementioned terms in the present disclosure can be understood according to specific conditions.

Figure 1:
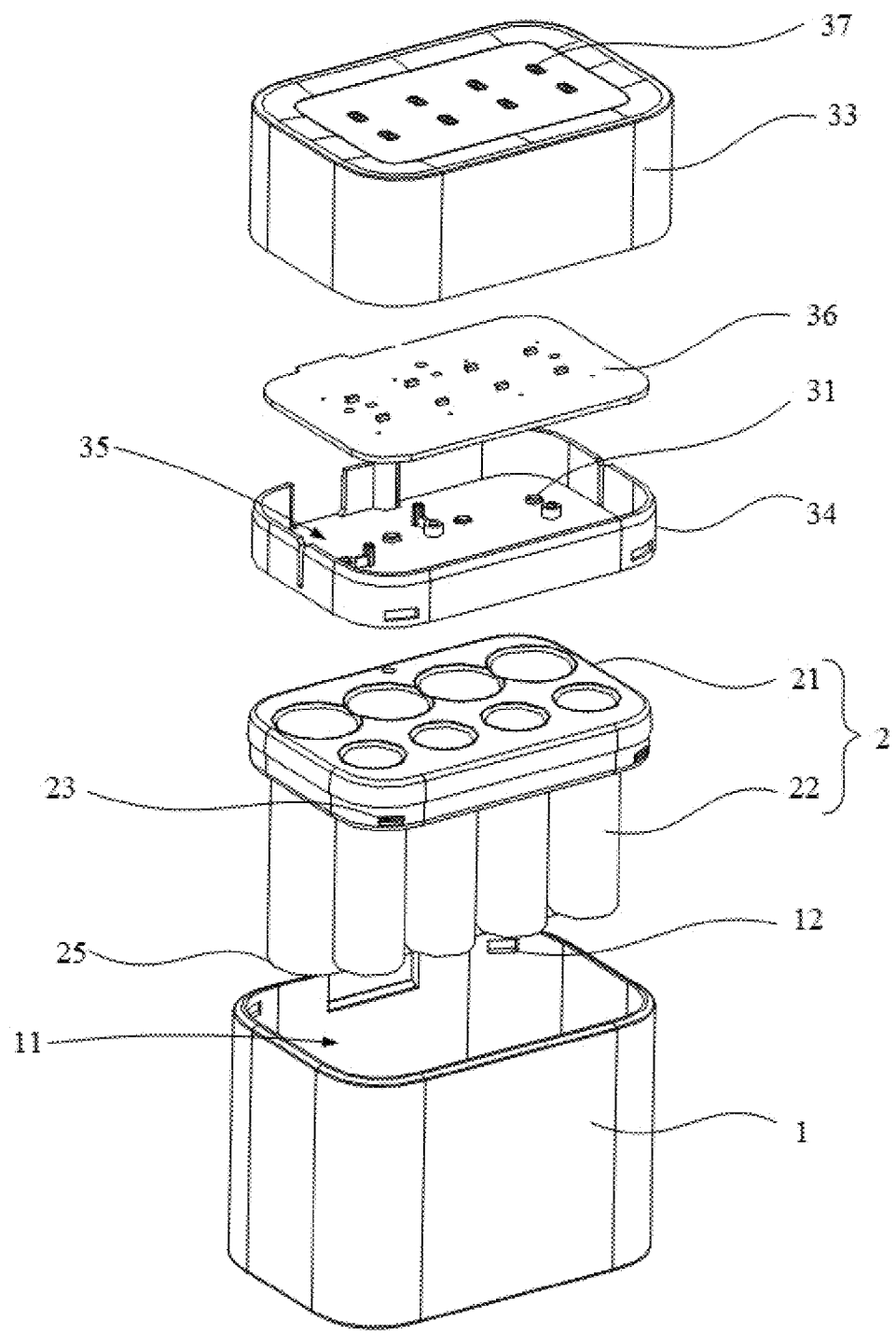
FIG. 1 is an exploded diagram of an embodiment according to the present disclosure.
Figure 2:
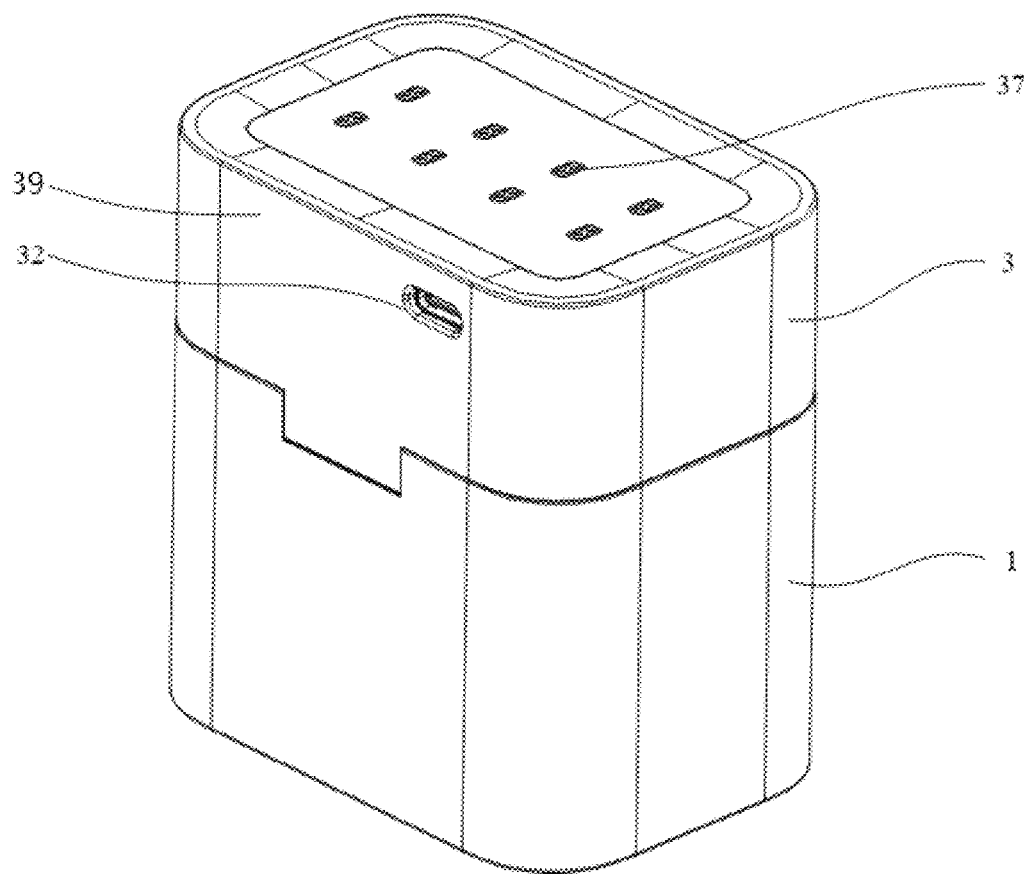
FIG. 2 is an overall schematic diagram of an embodiment according to the present disclosure.
Figure 3:
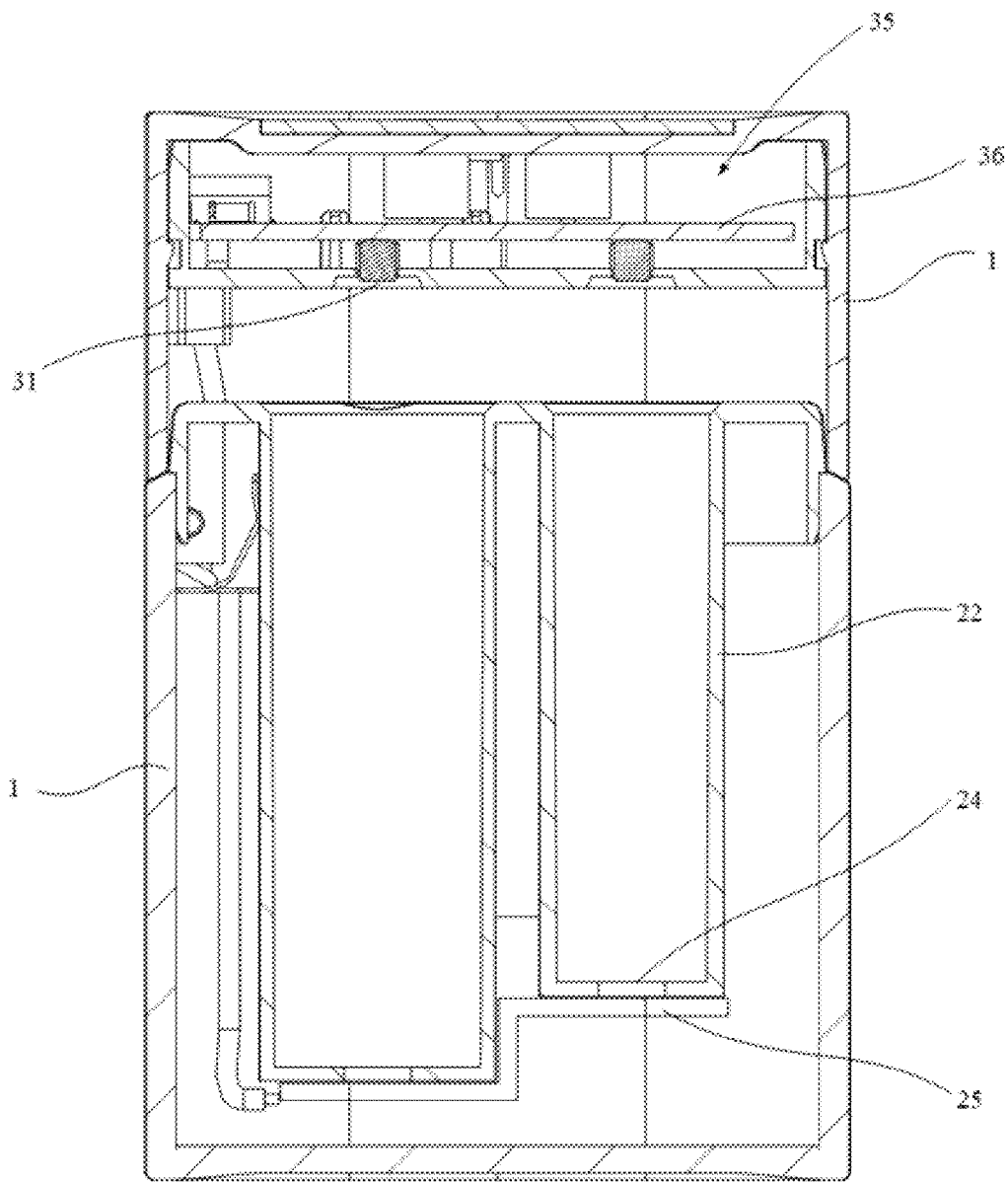
FIG. 3 is a cross-sectional view of an embodiment according to the present disclosure.

As shown in FIGS. 1 to 3, the present disclosure provides a battery charger, which comprises a housing 1 and a cover 3, wherein the housing 1 is provided with an open end 11, a charging stand 2 is arranged inside the housing 1, multiple positioning grooves 22 are arranged on the charging stand 2 in an array to fix batteries, and a positive electrode plate 25 is attached to bottoms of the positioning grooves 22; and the cover 3 is rotatably connected to the open end 11, a negative electrode plate 31 is arranged on an inner wall surface of the cover 3 corresponding to the positioning grooves 22, a charging interface 32 is formed on a side wall of the cover 3, and the charging interface 32 is electrically connected to the positive electrode plate 25 and the negative electrode plate 31 to charge the batteries. It may be understood that the positive electrode plate 25 and the negative electrode plate 31 may be interchangeable under some conditions. Meanwhile, in some embodiments, the cover 3 can be directly connected to the housing body 1 in a clamping manner and the like, and the connection mode is not limited to the rotational connection.

It may be understood that the housing 1, the cover 3 and the charging stand 2 form the battery charger, one end of the housing 1 is open, the charging stand 2 is mounted inside the housing 1, a plurality of cylindrical positioning grooves 22 are formed on the charging stand 2, a battery is inserted into one of the positioning grooves 22, a positive electrode plate 25 is arranged on bottoms of the positioning grooves 22, and the positive electrode of the battery contacts the positive electrode plate 25 when inserted into the positioning groove 22; and the cover 3 is connected to a side wall of the open end 11 of the housing 1 and can rotate around the side wall to open/close the charger, a negative electrode plate 31 is arranged on an inner wall surface of the cover 3, when the cover 3 is closed, the negative electrode plate 31 contacts the negative electrode of the battery inserted into the positioning groove 22, a charging interface 32 is arranged on the side wall of the cover 3, and the charging interface 32 is electrically connected to the positive and negative electrodes. Through the above arrangement, the battery in the positioning groove 22 can be charged when the cover 3 is closed, and the negative electrode plate 31 is separated from the battery when the cover 3 is opened, and the charging is disconnected, so that the charging process of the battery can be easily controlled.

The diameter and depth of the positioning groove 22 are the same as the diameter and length of the battery. Since different models of batteries have different sizes, a plurality of charging stands 2 with different sizes of positioning grooves 22 can be produced, and different models of batteries can be charged by replacing the charging stands 2 without replacing the entire charger. Alternatively, different sizes of positioning grooves 22 can be arranged on the same charging stand 2, for example, two rows of positioning grooves 22 on the charging stand 2 are provided in this embodiment, wherein one row corresponds to the size of the AAA battery, and the other row corresponds to the size of the AA battery. Through the above arrangement, the same charger can be used to charge different models of batteries, which has high versatility and greatly improves the user's convenient experience.

As shown in FIGS. 1 to 3, in an embodiment of the present application, the charging stand 2 comprises a mounting plate 21, the mounting plate 21 is connected to the open end 11, and multiple positioning grooves 22 are arranged on the mounting plate 21 in an array.

It may be understood that the mounting plate 21 is detachably connected to the open end 11 of the housing 1, which is not only convenient for inspection and maintenance, but also convenient for replacing the mounting plate 21 with different sizes of positioning grooves 22, thereby achieving charging of different models of batteries.

The mounting plate 21 and the positioning grooves 22 are integrally formed. The integral forming process not only simplifies the connection mode between the mounting plate 21 and the positioning grooves 22, but also improves the connection stability between the mounting plate 21 and the connection grooves. In addition, the integral component is molded in fewer forming times, and has high processing efficiency and better size consistency.

As shown in FIGS. 1 to 3, in an embodiment of the present application, the periphery of the mounting plate 21 is provided with a plurality of clamping buckles 23, and a plurality of clamping grooves 12 are arranged on an inner wall of the open end 11 corresponding to the clamping buckles 23.

It may be understood that the mounting plate 21 is connected to the housing 1 by the clamping buckles 23 and the clamping grooves 12. Compared with other connection modes, this connection mode is simple and convenient, the connection mode between the clamping buckles 23 and the clamping grooves 12 is usually designed to be relatively simple and easy to operate, so that the assembly and disassembly process is more convenient, special tools are not required, and the assembly process is fast, which can save a lot of mounting time; this connection mode has a good fixing effect, and the structure of the clamping buckles 23 and the clamping grooves 12 can provide a better positioning effect, so that the mounting plate 21 and the housing 1 are not prone to shaking, which helps to maintain the stability of the battery during charging; and this connection method has a beautiful appearance, and the design of the clamping buckles 23 and the clamping grooves 12 can make the connecting part more compact without gaps, and the appearance is better.

As shown in FIGS. 1 to 3, in an embodiment of the present application, a positive electrode hole 24 is formed at the bottom of the positioning groove 22, and a positive electrode plate 25 is attached to the positive electrode hole 24.

It may be understood that since the positive electrode of the battery is generally provided with a small protruding metal pillar, to prevent the user from placing the battery into the positioning groove 22 in the wrong direction, a positive electrode hole 24 is opened at the bottom of the positioning groove 22, the other side of the positive electrode hole 24 is the positive electrode plate 25, the small metal pillar of the positive electrode of the battery contacts the positive electrode plate 25 to be charged only by passing through the positive electrode hole 24; and if the battery is placed in the wrong direction, when the negative electrode is positioned in the positioning groove 22, since the negative electrode of the battery is not provided with a protruding portion capable of passing through the positive electrode hole 24, the negative electrode of the battery cannot contact the positive electrode plate 25, and the battery cannot be electrified. Through the above arrangement, safety accidents caused by electrifying the battery after the battery is placed in the wrong direction can be avoided, so that the charger has a higher safety factor. Meanwhile, this design also has a certain fool-proof effect, which enables the user to naturally insert the battery into the positioning groove 22 in the correct direction after observing the positive electrode hole 24.

As shown in FIGS. 1 to 3, in an embodiment of the present application, the cover 3 comprises an upper cover portion 33 and a lower cover portion 34, the upper cover portion 33 and the lower cover portion 34 enclose to form a circuit cavity 35, a circuit board 36 is arranged inside the circuit cavity 35, and the charging interface 32, the positive electrode plate 25, and the negative electrode plate 31 are all electrically connected to the circuit board 36.

It may be understood that the cover 3 is composed of the upper cover portion 33 and the lower cover portion 34, which enclose to form a cavity, and the cavity is used to mount the circuit board 36. Since the rated voltage of the battery is generally far lower than the household voltage, the battery can be charged only by reducing the voltage, the circuit board 36 at least integrates a power module, a current detection module, a control module, a temperature detection module and the like, the charging interface 32, the positive electrode plate and the negative electrode plate are all connected to the circuit board 36, and the current entering from the charging interface 32 can enter the battery after being processed; and the positive electrode plate and the negative electrode plate are connected to the circuit board 36 through hardware posts, so that this method is simple and effective, and can also reduce manufacturing costs.

Further, the circuit board 36 may further integrate a wireless communication module, including a wireless signal transmitter, a wireless signal receiver and an antenna, which can perform wireless communication with a communication terminal, such as a mobile phone of a user, so as to facilitate the user to remotely control the device, keep track of the charging status of the battery at any time, and avoid safety accidents caused by battery overcharging or overheating.

As shown in FIGS. 1 to 3, in an embodiment of the present application, a power indicator light 37 is arranged on an outer surface of the upper cover portion 33 corresponding to the positioning grooves 22.

It may be understood that the power indicator light 37 is also electrically connected to the circuit board 36 and can display the battery power in real time. Through the above arrangement, the battery charging process can be visualized, and the user can understand the battery charging progress through the changes in the indicator light, which can help the user more easily determine when the battery is fully charged and avoid shortening the battery service life due to overcharging.

In summary, this embodiment has the following beneficial effects: in this embodiment, a charging stand 2 is arranged inside a housing 1, multiple positioning grooves 22 erected side by side are formed in the charging stand 2, a battery is placed in one of the positioning grooves 22, one end of the battery is connected to a positive electrode plate 25, and the other end of the battery is connected to a negative electrode plate 31. Through the above arrangement, the batteries vertically placed side by side can be charged. Compared with the conventional mode of charging a row of batteries placed horizontally, the present disclosure greatly reduces the size of the charger and facilitates carrying and storage.

Figure 4:
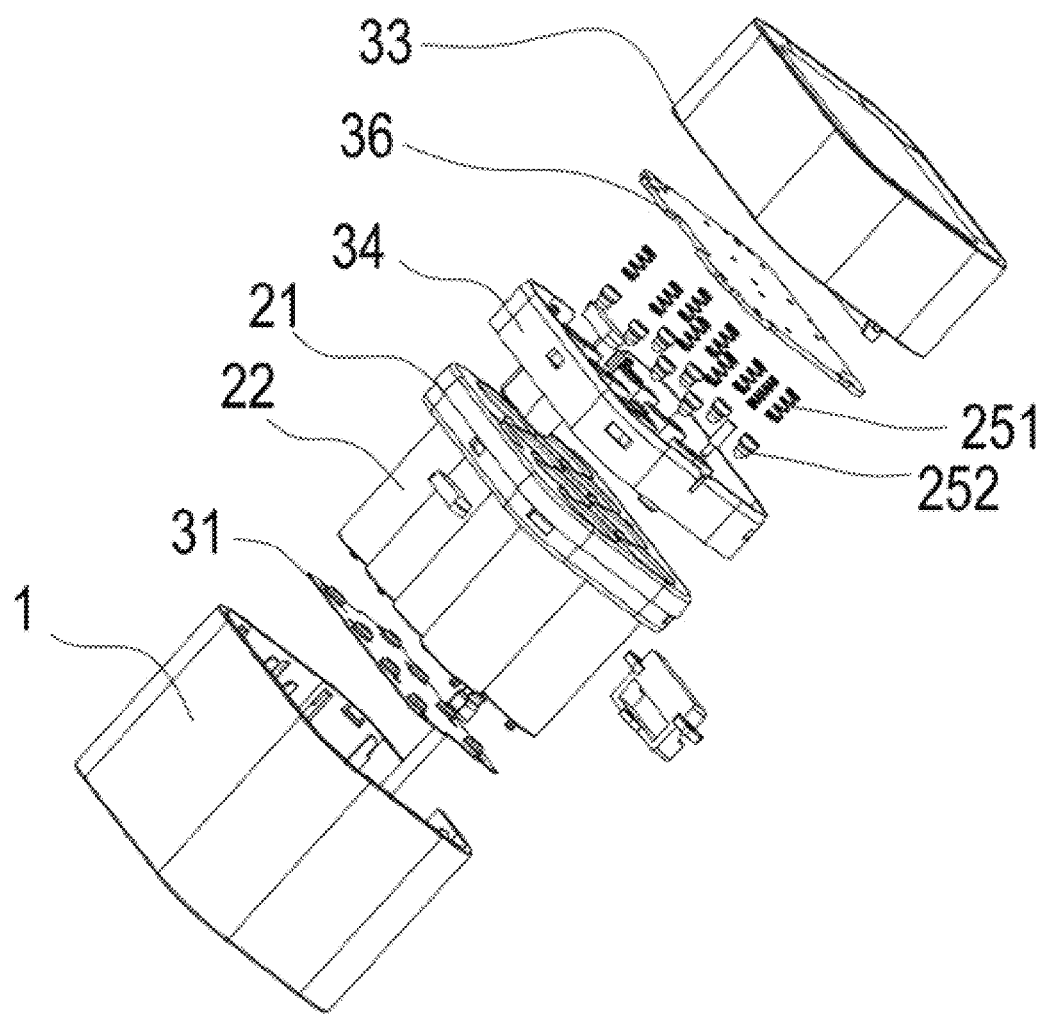
FIG. 4 is an exploded view of another embodiment according to the present disclosure.
Figure 5:
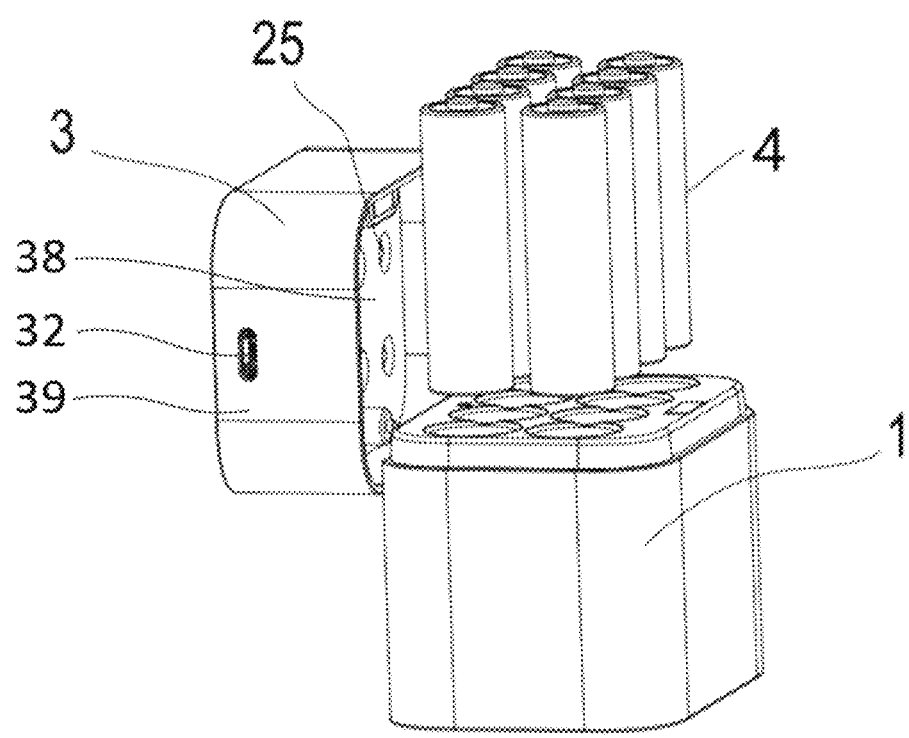
FIG. 5 is an open state diagram of the embodiment shown in FIG. 4.

The present disclosure further provides an embodiment. Referring to FIG. 4 and FIG. 5, the structure of this embodiment is substantially the same as the previous embodiment, except that the positive electrode plate 25 is positioned inside the cover 3. Specifically, only when the positive electrode plate 25 is recessed in the inner wall surface 38 of the cover, the small metal pillar of the positive electrode of the battery can contact the positive electrode plate 25 to be charged, so as to prevent the battery from being placed in the wrong direction.

Further, the positive electrode plate 25 comprises a spring 251 and hardware 252. Generally, the spring 251 is in an extended state and abuts against the hardware 252. When the battery is placed and the cover 3 is closed, the positive electrode of the battery contacts the positive electrode plate 25, and the spring 251 is compressed.

Figure 6:
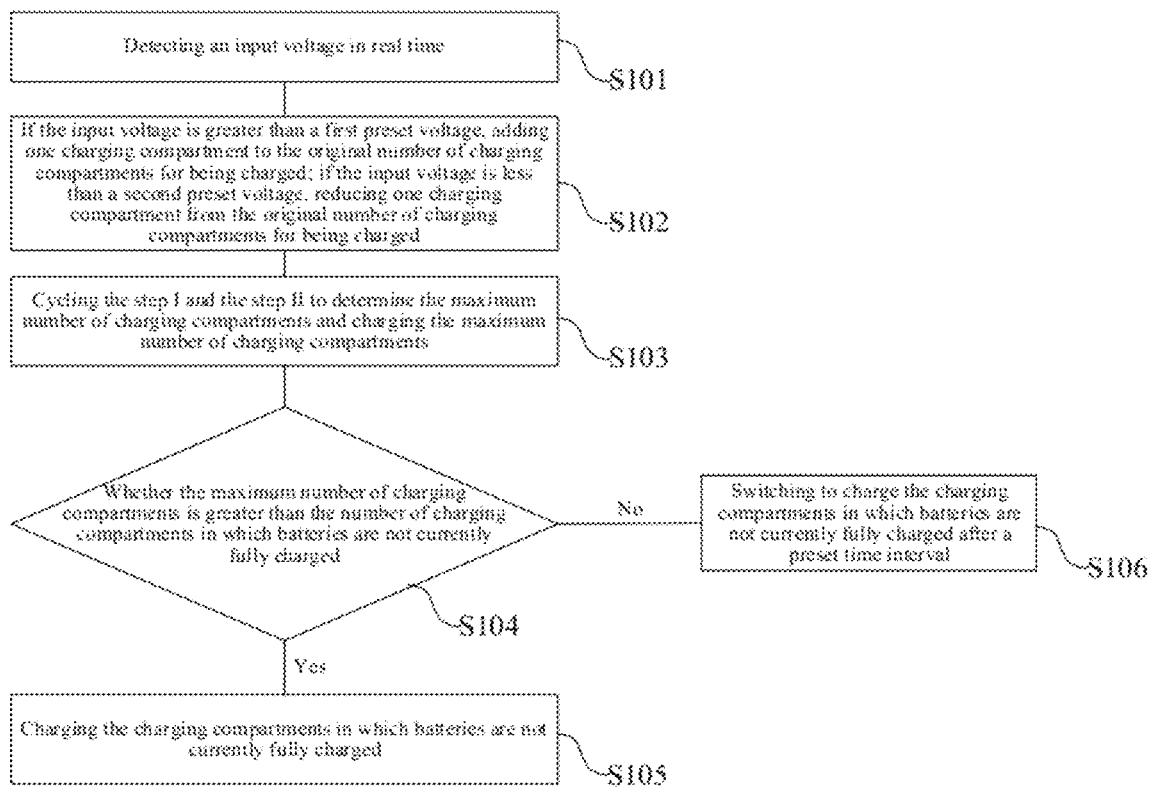
FIG. 6 is a flowchart of an embodiment of a charging control method.

Referring to FIG. 6, the present disclosure further discloses a charging control method, which is implemented based on the battery charger according to the foregoing embodiment, each of the positioning grooves of the battery charger corresponds to one charging compartment, and the charging control method comprises:

S101: detecting an input voltage in real time.

Generally, when a battery charger charges a battery, all batteries are charged simultaneously. However, when the power of the adapter is not sufficient, if this charging method is still used, the battery charger is in pull protection, and the power supply will be repeatedly turned on and off during the battery charging, resulting in the failure of the battery to be charged. 8 charging compartments in the above embodiment are taken as an example. Assuming that the specification of the battery is 350 mA and the specification of the adapter is 5V1A, when the adapter of the specification is used for charging, since the adapter cannot provide the voltage for charging 8 charging compartments at the same time, repeated pull protection occurs and charging cannot be performed.

To improve this situation, this embodiment detects the input voltage in real time.

S102: if the input voltage is greater than a first preset voltage, adding one charging compartment to the original number of charging compartments for being charged; if the input voltage is less than a second preset voltage, reducing one charging compartment from the original number of charging compartments for being charged.

The first preset voltage is 4.5 V, and the second preset voltage is 4.4 V. For example, when 3 charging compartments are currently provided, and the detected input voltage is greater than 4.5 V, it is considered that the adapter can charge more charging compartments, and based on this, the number of the charging compartments is increased to 4; and when the detected input voltage is less than 4.4 V, it is considered that the adapter cannot carry more charging compartments, and based on this, the number of the charging compartments is decreased to 2.

The first preset voltage and the second preset voltage can be set based on actual conditions.

S103: cycling the step I and the step II to determine the maximum number of charging compartments and charging the maximum number of charging compartments.

This method can ensure that the maximum number of charging compartments are used for charging, so that the battery can be fully charged quickly, and the failure to charge the battery due to inappropriate adapter power is avoided.

S104: judging whether the maximum number of charging compartments is greater than the number of charging compartments in which batteries are not currently fully charged.

S105: charging the charging compartments in which batteries are not currently fully charged.

If the maximum number of charging compartments is greater than the number of the charging compartments in which batteries are not currently fully charged, it is proved that the adapter can charge all charging compartments not fully charged simultaneously to ensure the fastest charging speed.

S106: switching to charge the charging compartments in which batteries are not currently fully charged after a preset time interval.

If the maximum number of the charging compartments is less than the number of the charging compartments in which batteries are not currently fully charged, the charging compartments in which batteries are not currently fully charged are switched to be charged after a preset time interval. This ensures that the batteries are charged in turn, rather than switching to another battery after the battery is fully charged.

The above-mentioned embodiments are only preferred embodiments of the present disclosure, and the scope of the present disclosure should not be limited thereby. Any insubstantial changes and modifications made by those skilled in the art based on the present disclosure shall fall within the scope of the present disclosure.

The invention claimed is:

1. A battery charger, comprising:
    a housing, wherein the housing is provided with an open end, a charging stand is arranged inside the housing, multiple positioning grooves are arranged on the charging stand in an array to fix batteries, and a first electrode plate is attached to bottoms of the positioning grooves; and
    a cover, wherein the cover is connected to the open end, a second electrode plate is arranged on an inner wall surface of the cover corresponding to the positioning grooves, a side wall of the cover is provided with a charging interface, and the charging interface is electrically connected to the first electrode plate and the second electrode plate to charge batteries;
    wherein the cover is rotatably connected to the housing, the battery in the positioning groove is charged when the cover is closed, and the negative electrode plate is separated from the battery when the cover is opened, and the charging is disconnected, to control the charging process of the battery;
    wherein the charging stand comprises a mounting plate, the mounting plate is detachably connected to the open end, and the multiple positioning grooves are arranged on the mounting plate in an array;
    the mounting plate and the positioning grooves are integrally formed;
    wherein a periphery of the mounting plate is provided with a plurality of clamping buckles, and a plurality of clamping grooves are arranged on an inner wall of the open end corresponding to the clamping buckles.

2. The battery charger according to claim 1, wherein the first electrode plate is a negative electrode plate, and the second electrode plate is a positive electrode plate.

3. The battery charger according to claim 1, wherein the cover comprises an upper cover portion and a lower cover portion, the upper cover portion and the lower cover portion enclose to form a circuit cavity, a circuit board is arranged inside the circuit cavity, and the charging interface, the first electrode plate, and the second electrode plate are all electrically connected to the circuit board.

4. The battery charger according to claim 3, wherein a power indicator light is arranged on an outer surface of the upper cover portion corresponding to the positioning grooves.

5. A charging control method, wherein the charging control method is implemented based on the battery charger according to claim 1, each of the positioning grooves of the battery charger corresponds to one charging compartment, and the charging control method comprises:
    step I: detecting an input voltage in real time;
    step II: if the input voltage is greater than a first preset voltage, adding one charging compartment to the original number of charging compartments for being charged; if the input voltage is less than a second preset voltage, reducing one charging compartment from the original number of charging compartments for being charged; and
    step III: cycling the step I and the step II to determine the maximum number of charging compartments and charging the maximum number of charging compartments.

6. The charging control method according to claim 5, further comprising: after the step III,
    judging whether the maximum number of charging compartments is greater than the number of charging compartments in which batteries are not currently fully charged; and
    if yes, charging the charging compartments in which batteries are not currently fully charged.

7. The charging control method according to claim 6, wherein if not, switching to charge the charging compartments in which batteries are not currently fully charged after a preset time interval.

8. A battery charger, comprising:
    a housing, wherein the housing is provided with an open end, a charging stand is arranged inside the housing, multiple positioning grooves are arranged on the charging stand in an array to fix batteries, and a first electrode plate is attached to bottoms of the positioning grooves; and
    a cover, wherein the cover is connected to the open end, and a second electrode plate is arranged on an inner wall surface of the cover corresponding to the positioning grooves;
    a side wall of the cover is provided with a charging interface, and the charging interface is electrically connected to the first electrode plate and the second electrode plate to charge batteries;
    wherein the cover is rotatably connected to the housing, the battery in the positioning groove can be is charged when the cover is closed, and the negative electrode plate is separated from the battery when the cover is opened, and the charging is disconnected, to control the charging process of the battery;
    wherein the charging stand comprises a mounting plate, the mounting plate is detachably connected to the open end, and the multiple positioning grooves are arranged on the mounting plate in an array;

the mounting plate and the positioning grooves are integrally formed;

wherein a periphery of the mounting plate is provided with a plurality of clamping buckles, and a plurality of clamping grooves are arranged on an inner wall of the open end corresponding to the clamping buckles;

wherein through holes are formed at bottoms of the positioning grooves, the first electrode plate is attached to the through holes, and a metal pillar of a positive electrode of the battery contacts the first electrode plate to be charged only by passing through each of the through holes, so as to prevent the battery from being placed in the wrong direction, wherein the second electrode plate is a negative electrode plate, and the first electrode plate is a positive electrode plate; or a metal pillar of a positive electrode of the battery contacts the second electrode plate to be charged only when the second electrode plate is recessed in an inner wall surface of the cover, so as to prevent the battery from being placed in the wrong direction, wherein the first electrode plate is a negative electrode plate, and the second electrode plate is a positive electrode plate.

* * * * *